United States Patent
Kendall, Jr.

[11] Patent Number: 5,979,881
[45] Date of Patent: Nov. 9, 1999

[54] APPARATUS FOR MANUFACTURING AN INSULATED CONDUCTOR IN METAL TUBING

[76] Inventor: Clarence E. Kendall, Jr., 3828 Wickersham, Houston, Tex. 77027

[21] Appl. No.: 09/162,908

[22] Filed: Sep. 29, 1998

Related U.S. Application Data

[63] Continuation-in-part of application No. 08/690,719, Jul. 31, 1996.

[51] Int. Cl.⁶ .................................................... B66F 3/24
[52] U.S. Cl. ........................................................ 254/134.4
[58] Field of Search ........................ 254/134.4; 166/65.1

[56] References Cited

U.S. PATENT DOCUMENTS

| | | | |
|---|---|---|---|
| 4,064,939 | 12/1977 | Marquis | 254/134.4 |
| 5,246,207 | 9/1993 | Horii et al. | 254/134.4 |
| 5,374,034 | 12/1994 | Flores, Sr. et al. | 254/134.4 |
| 5,433,365 | 7/1995 | Davies | 254/134.4 |
| 5,435,395 | 7/1995 | Connell | 166/65.1 |
| 5,762,321 | 6/1998 | Petersen et al. | 254/134.4 |
| 5,813,658 | 9/1998 | Kaminski et al. | 254/134.4 |
| 5,823,256 | 10/1998 | Moore | 166/65.1 |
| 5,855,062 | 1/1999 | Kendall, Jr. | 29/828 |

FOREIGN PATENT DOCUMENTS

| | | | |
|---|---|---|---|
| 002670336 | 6/1992 | France | 254/134.4 |
| 406121425 | 4/1994 | Japan | 254/134.4 |

Primary Examiner—David A. Scherbel
Assistant Examiner—Daniel G. Shanley
Attorney, Agent, or Firm—Fulbright & Jaworski

[57] ABSTRACT

An apparatus for making a length of insulated electrical cable in a metal tubing by providing a vertically extending pipe, a metal tubing positioned in the pipe, an enlarged extension tube and a crossover connected to the top of the tubing. A piston pig connected to an insulated wire is lowered by gravity and fluid pressure through the extension tube, crossover and metal tubing.

9 Claims, 3 Drawing Sheets

5,979,881

APPARATUS FOR MANUFACTURING AN INSULATED CONDUCTOR IN METAL TUBING

CROSS-REFERENCE TO RELATED APPLICATION

The present application is a continuation-in-part of application Ser. No. 08/690,719 filed Jul. 31, 1996 entitled Method and Apparatus for Manufacturing an Insulator Conductor in Metal Tubing.

FIELD OF INVENTION

The present invention is directed to an apparatus for manufacturing long lengths of electrical cable in which an insulated electrical conductor is positioned inside of a metal tubing.

BACKGROUND OF THE INVENTION

There is a need for long lengths of an insulated electrical conductor wire encased in metal tubing, for example, in wells for providing electrical power and/or making various measurements from various types of instruments. In such cases, the electrical cable may be of a long length, for example only, as much as 15,000 feet long. The manufacture of such cable is both expensive and difficult.

The present apparatus is particularly advantageous by manufacturing such a cable in a vertical position wherein various types of forces can be utilized such as gravity forces, vacuum forces, and pressure forces, to control the insertion of an electrical conductor into the inside of an outer metal tubing.

SUMMARY

The present invention is directed to an apparatus for making an insulated electrical conductor in a metal tubing and includes a generally longitudinally extending pipe generally vertically extending and having an inside and an upper and lower end. A length of metal tubing is longitudinally positioned in the inside of the pipe and the tubing has an outside of a size less than the size of the inside of the pipe and includes open upper and lower ends. An extension tube is vertically positioned above the metal tubing and the extension tube has an internal diameter greater than the internal diameter of the tubing and has upper and lower ends. A crossover is connected to and is positioned between the lower end of the extension tube and the upper end of the metal tubing and the crossover has an upper end having the same internal diameter as the extension tube and a lower end having the same internal diameter as the tubing and includes a passageway therethrough tapering in size between the upper and lower ends of the crossover. A length of a electrically conductive wire having insulated cover thereon having an outside less than the size of the inside of the tubing is connected to a piston pig for assisting in moving the wire downwardly through the inside of the extension tube, the crossover, and through the inside of the tubing by gravity and by differential fluid pressure. Fluid pressure means are provided for applying fluid pressure to the pig.

The apparatus of the present invention further includes a reel initially supporting the conductive wire as it is inserted into the extension tube. In the preferred embodiment the reel is a spinning type reel.

A still further of object of the present invention is wherein the length of the extension tube is as long as the length of conductor wire which weighs enough to pull the conductor wire off of the reel.

Preferably, the pipe is positioned in a wellbore for ease of manufacture.

Another object is the provision of an air pump in communication with the upper end of the extension tube for moving the pig and wire therethrough, and an air pump is connected to the pipe for creating an air pressure in the metal tubing for controlling the speed of movement of the pig piston and wire through the tubing.

Another object of the present invention is wherein the outside size of the extension tube is less than the inside of the pipe whereby the extension tube may be positioned in the pipe.

Yet a further object is wherein a pressure chamber is provided enclosing the reel and is connected to the extension tube.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

The present invention is directed to an improvement in the method and apparatus of manufacturing an electrical cable encased in a metal tubing in a generally vertical position for reducing damage to the wire conductor while being inserted into the tubing and to provide additional ways to control the passage of the conductor wire through the metal tubing, as more fully described and copending patent application Ser. No. 08,690,719, entitled "Method and Apparatus for Manufacturing an Insulated Conductor in Metal Tubing," which is herewith incorporated by reference.

Figure 3:
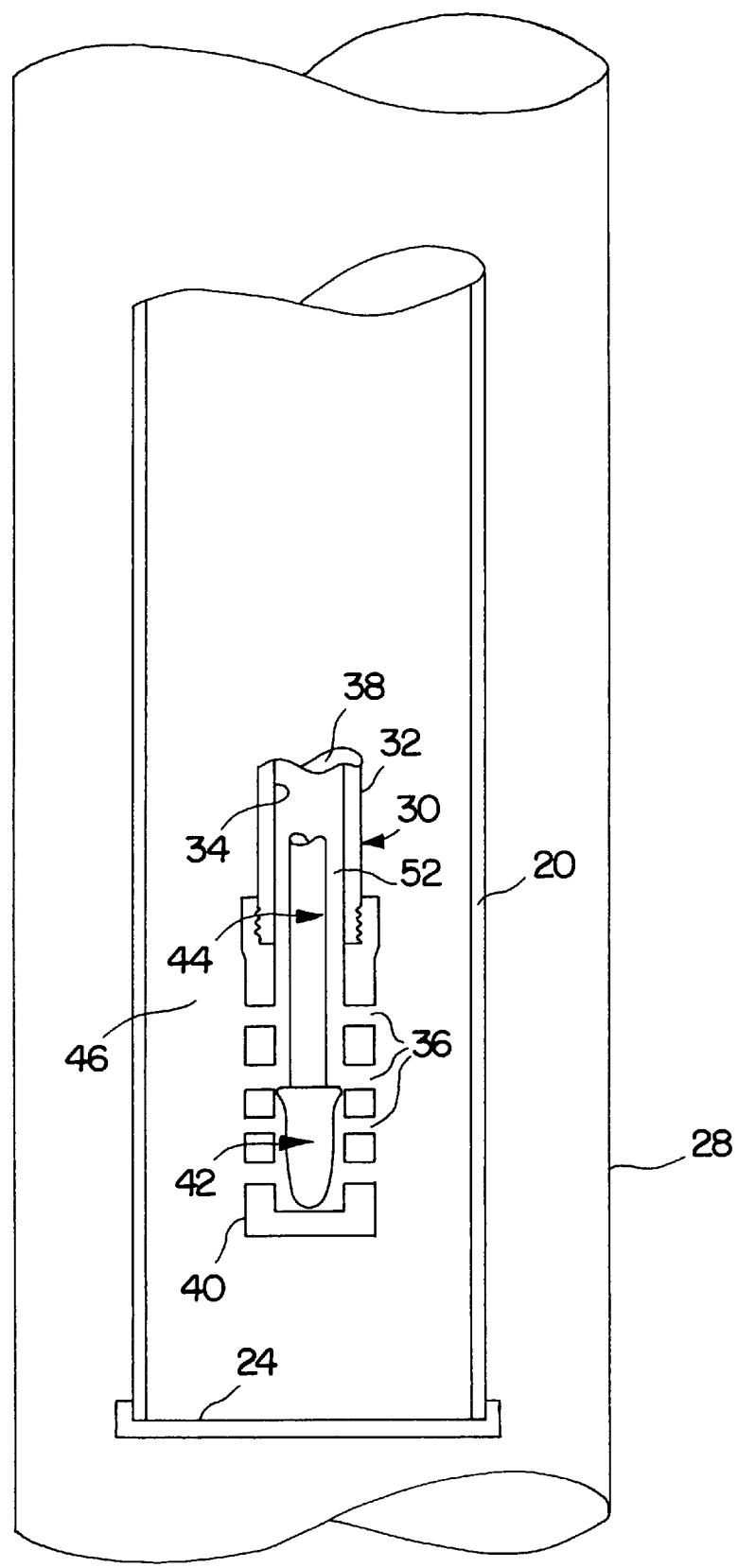

Referring now to the drawings, a generally longitudinally extending pipe 20 is vertically positioned, such as in a wellbore 28 (FIG. 3). The pipe includes an inside 22 an upper end 26 and a lower end 24. The pipe 20 provides a means to keep the manufacturing process as at least as straight as the pipe 20 and provides a relatively smooth and clean environment. Also the pipe 20 provides a container for controlling air pressure therein for reasons that will be more fully discussed hereinafter. The length of the pipe 20 used establishes the maximum length of the cable which is to be manufactured.

A metal tubing 30 is provided of a length corresponding to the length of cable desired to be manufactured and is longitudinally inserted into the inside 22 of the pipe 20. The tubing 30 has an outside 32, an inside 34, an open lower end consisting of a plurality of vents 36 and an upper end 38. Preferably a piston pig catcher 40 is connected to the lower end of the tubing 30 to prevent a piston pig 42 which is connected to an insulated conductor wire 44 from extending out of the bottom of the metal tubing 30 and inadvertently catching therein. For example only, the pipe 20 may have an inside diameter 22 of approximately 2", and the outside diameter 32 of the metallic tubing 30 may be approximately ¼" thereby providing an annulus 46 when the tubing 30 is inserted into the pipe 20.

Figure 2:
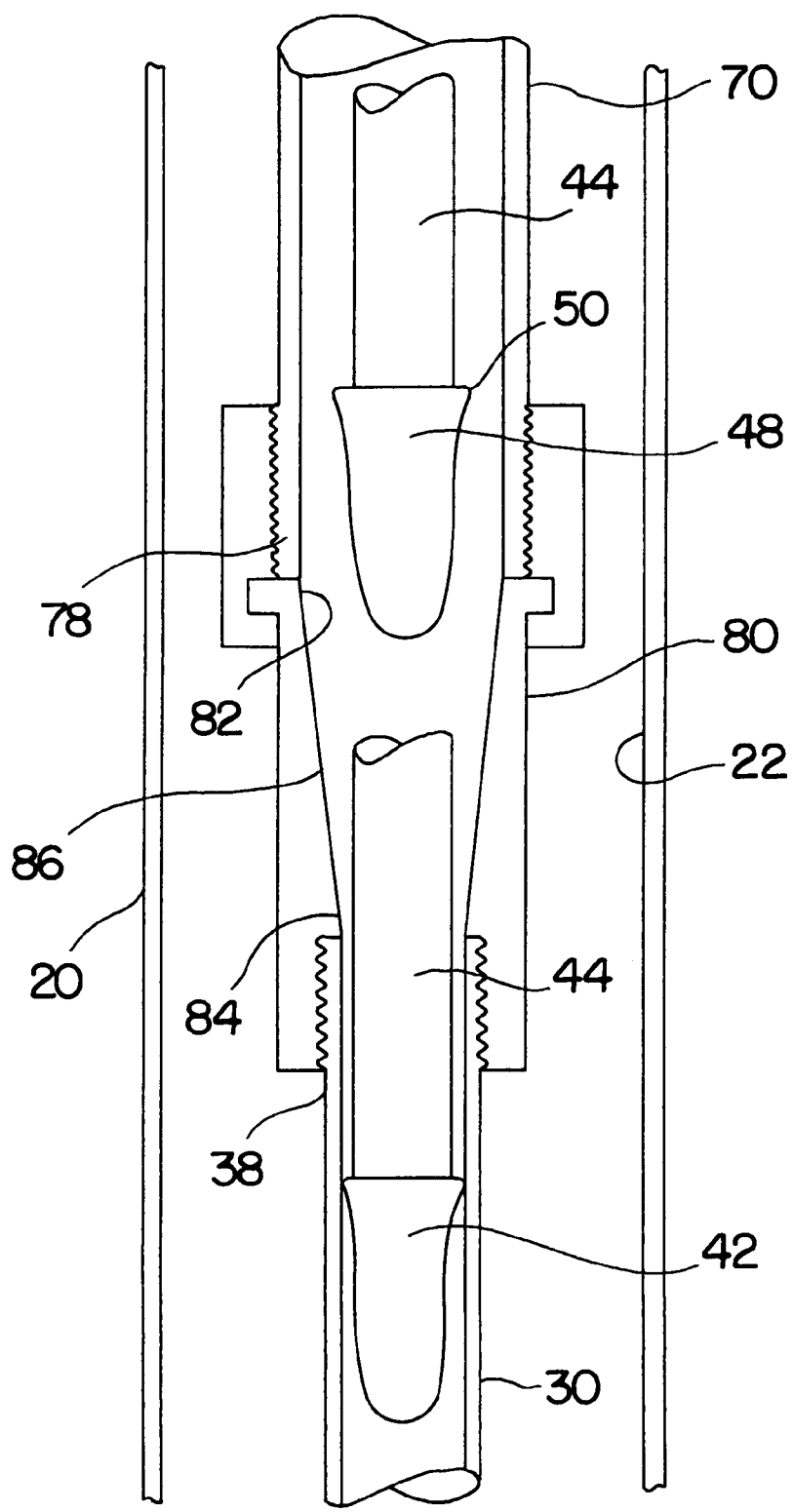

Referring now to FIGS. 2 and 3, one or more piston pigs 42 are provided connected to an insulated conductor wire 44 to provide a piston which is movable in the metal tubing 30 in response to a differential pressure across the piston 42. Any suitable piston pig may be provided, and in one embodiment a length of heat shrunk plastic tubing 48 is placed over the insulated conductor wire 44 and heat shrunk thereon while a portion 50 is left unshrunk to provide a skirt to be acted upon by air pressure, but will be flexible so as not to provide sufficient friction to deter its travel along the inside 34 of the tubing 30.

The insulator conductor wire 44, which may be any conductive wire wires, such as copper, steel or aluminum, covered by suitable insulator, is of a length generally matching the length of the metal tubing 30 inserted into the pipe 20. The cover of the conductor wire has an outside diameter less than the inside diameter 34 of the metal tubing 30 whereby the conductor 34 may be easily moved and inserted through the metal tubing 30, and provide an annulus 52 therebetween.

A fluid pressure means 60 (FIG. 1) is provided in communication with the inside of the pipe 20 and in the annulus between the pipe 20 and the tubing 30 and thus in communication with the vents 36 (FIG. 3) in communication with a lower end of the inside of the tubing 30. The pressure means 60 may include a vacuum pump for supplying a vacuum to the annulus 46 and/or positive pressure to the annulus 46 and thus to the inside of the bottom of the tubing 30. Thus, either a vacuum pressure or a positive pressure may be applied to the annulus 46 and thus to the lower end of the tubing 30 to act against one or more piston pigs 42 to control the descent of the piston pigs 42 and the conductor wire 44 downwardly into the tubing 30.

The above description of the method and apparatus for manufacturing an insulator electrical conductor in an encased metal tubing is more fully described in a copending patent application Ser. No. 08/690,719, which is herewith incorporated by reference.

The present invention is directed to an improvement to increase the speed at which the conductor wire 44 enters into the metal tubing 30 which will decrease manufacturing time. The present invention is directed to an extension tube 70 which is vertically positioned above the metal tubing 30 and supported conventionally by a slip assembly 72 and wellhead (not shown). The extension tube has an internal diameter 74 greater than the internal diameter 34 of the tubing 30. The extension tube 70 also includes an upper end 76 and a lower end 78. A crossover 80 is connected to and positioned between the lower end 78 of the extension tube 70 and the upper end 38 of the metal tubing 30. The crossover 80 has an upper end 82 having the same internal diameter as the diameter 74 of the extension tube 70 and has a lower end 84 having the same internal diameter 34 of the metal tubing 30 and having a passageway 86 tapering in size between the upper 82 and lower 84 ends of the crossover 80.

The extension tube 70 has an external diameter less than the internal diameter of the pipe 20 so that the extension tube 70, attached crossover 80, and attached tubing 30 may be connected and extended into the pipe 20 and hung from a wellhead.

Figure 1:
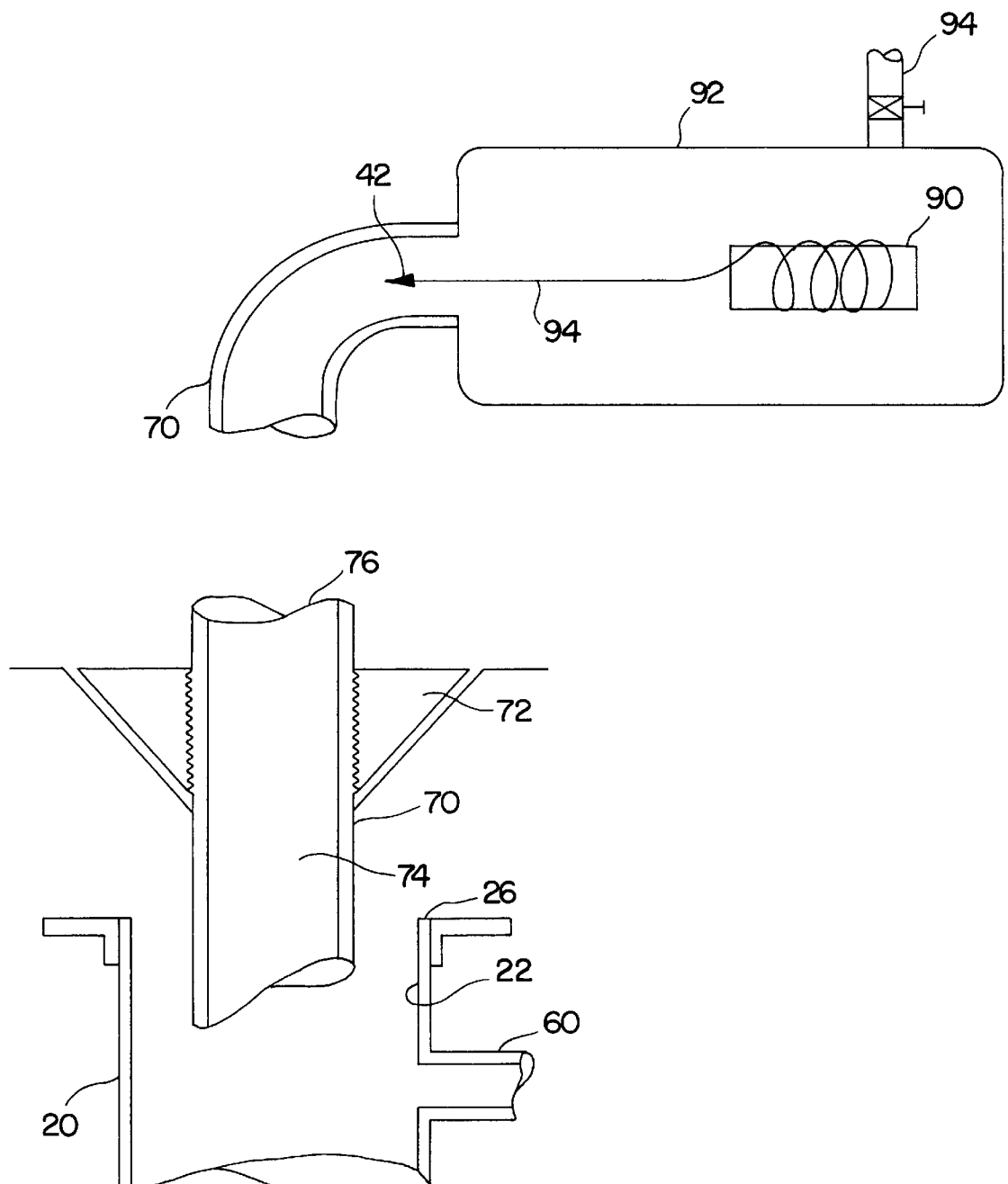
FIGS. 1, 2 and 3 are continuations of each other and are fragmentary elevational views, partly schematic, illustrating the apparatus of the present invention.

Preferably, as best seen in FIG. 1 the conductor wire 44 is supported from a reel 90, preferably a spinning reel which is enclosed in a pressure chamber 92 and connected to an air supply 94 for supplying pressurized air therein. The extension tube 70 is connected to the pressure chamber 92.

In manufacturing operation the tubing 30 is connected to and supported from the crossover 80 which in turn is connected to and supported from the extension tube 70, all of which are connected and lowered into the pipe 20. The connector wire 40 with one or more piston pigs attached thereto is inserted into the top of the extension tube 70 and air pressure from the air supply 94 will move the pig or pigs 42 and conductor wire 44 downwardly through the extension tube 70. Preferably the inside diameter 74 of the extension tube 70 is larger than the skirt 50 on the piston pigs 42 although of course the flexible skirt could engage the inside of the extension tube 70. However, even with a smaller skirt 50 there is sufficient fluid pressure on the skirt 50 to move the pig 42 and conductor wire 44 downwardly through the extension tube 70. However, with a smaller skirt 50 that does not engage the inside of the extension tube 70 there will be less friction between the inside of the extension tube 70 and the pig 42 and conductor wire 44 so that the conductor wire 44 will drop more freely through the extension tube 70 and the drop will be accelerated by air pressure.

When the pig 42 enters the crossover 80 the air force behind the pig 42 will increase as the pig will engage and seal on the inside 86 of the crossover 80 and the weight of the hanging part of the conductor wire 44 will be sufficient to aid in pulling the wire 44 through the crossover 80 and the tubing 30. As the length of the conductor wire 40 increases so does its hanging weight and due to its increased weight it will move downwardly by gravity. Along with the air pressure above and/or with decreased pressure below the pig, the time that it takes for the conductor 40 to enter the tubing will be a minimum. Preferably the length of the extension tube 70 should be as long as a length of conductor wire 44 which weighs enough to pull one loop of conductor wire 44 off of the reel 90.

The present improvement therefore, moves the wire into the tubing 30 at a faster rate and increases manufacturing time.

After the wire 44 has been inverted into the tubing 30, the tubing 30 and enclosed wire 44 are removed from the pipe 20 and wound on a shipping reel as described in application Ser. No. 08/690,719.

The present invention, therefore is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art which are encompassed within the spirit of the invention, and the scope of the appended claims.

What is claimed is:

1. An apparatus for making an insulated electrical conductor in a metal tubing comprising;

a generally longitudinally extending pipe generally vertically extending and having an inside and an upper and lower end, a length of metal tubing longitudinally extending in the inside of the pipe, said tubing having an outside of a size less than the size of the inside of the pipe, and having open upper and lower ends, an extension tube vertically positioned above the metal tubing, said extension tube having an internal diameter greater than the internal diameter of the tubing, and having upper and lower ends, a crossover connected to and positioned between the lower end of the extension tube and the upper end of the metal tubing, said crossover having an upper end having the same internal diameter as the extension tube and a lower end having the same internal diameter as the tubing and having a passageway therethrough tapering in size between the upper and lower ends of the crossover, a length of electrically conductive wire having an insulated cover thereon, said cover having an outside less than the size of the inside of the tubing, at least one piston pig connected to the wire for assisting in moving the pig downwardly through the inside of the extension tube, the crossover and through the inside of the tubing by gravity and by a differential fluid pressure, and fluid pressure means for applying fluid pressure to the pig.

2. The apparatus of claim 1 including, a reel initially supporting the conductive wire as it is inserted into the extension tube.

3. The apparatus of claim 2 wherein the reel is a spinning type reel.

4. The apparatus of claim 2 wherein the length of the extension tube is as long as the length of conductor wire which weighs enough to pull the conductor wire off of the reel.

5. The apparatus of claim 1 wherein the pipe is positioned in a well bore.

6. The apparatus of claim 1 including an air pump is in communication with the upper end of the extension tube.

7. The apparatus of claim 1 including an air pump connected to the pipe for creating an air pressure in the metal tubing.

8. The apparatus of claim 2 including a pressure chamber enclosing the reel and connected to the extension tube.

9. The apparatus of claim 1 wherein the extension tube has an outside sized less than the inside of the pipe.

* * * * *